Jan. 28, 1969 P. J. GREYLING 3,424,476
TOOL BAR HITCH

Filed Dec. 19, 1966 Sheet 1 of 2

INVENTOR
PIETER J. GREYLING
By Shoemaker and Mattare
ATTORNEYS

United States Patent Office 3,424,476
Patented Jan. 28, 1969

3,424,476
TOOL BAR HITCH
Pieter J. Greyling, 19 Berlyn St., Heidelberg, Transvaal,
Republic of South Africa
Filed Dec. 19, 1966, Ser. No. 602,777
Claims priority, application Republic of South Africa,
Dec. 22, 1965, 65/6,874; Feb. 17, 1966, 66/889
U.S. Cl. 280—443    4 Claims
Int. Cl. B62d 7/00, 13/00; A01b 69/00

ABSTRACT OF THE DISCLOSURE

The agricultural implement support coupling comprises two pairs of links, each pair including upper and lower links, with each of the links pivotally attached at one end to a rigid frame member carrying a three-point tractor hitch. The links are pivotally connected at their other end to a rigid implement support including a landwheel, kingpin and lever arm. The means for steering the landwheel comprises a rearwardly projecting arm rigidly connected to the rigid frame member and a link connecting the rear end of the arm to the lever arm of the landwheel.

---

Figure 1:
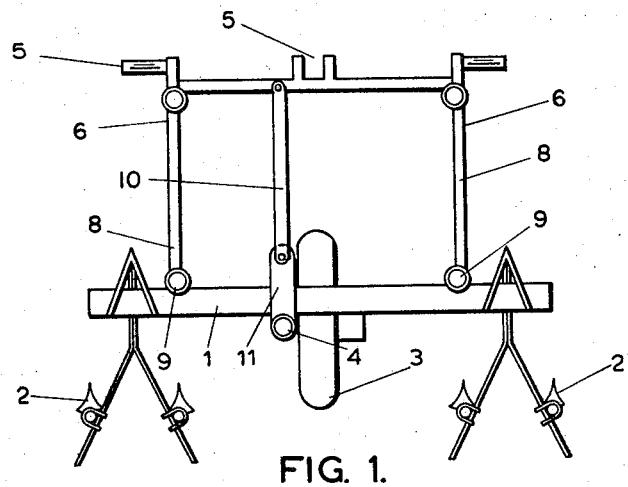

This invention relates to hitch assemblies and more particularly to such assemblies between a tractor and a trailing agricultural implement and which are referred to herein as implement couplings.

The normal trailed, semitrailed, or landwheel supported implements have to be independently steered necessitating an extra driver, because even when hydraulic powered three-point hitch is used, the implement still tends to meander with the slightest change of tractor direction. This is particularly disadvantageous with cultivator assemblies where such meandering can cause irreparable damage to at least part of several rows of crops.

It is the object of the present invention to provide a hitch assembly which will result in automatic steering of a landwheel supported trailing implement in a desirable manner.

According to this invention there is provided an implement coupling comprising a pair of links pivotally connectable to a tractor hitch at one end and at the other end to each other and to an implement, means associated with one end of the links connected to a steering member for a rotatable ground engaging part of the implement to cause pivoting of the member on angular displacement of the links.

Further features of this invention provide for the links to consist of rigid vertical frames, for the connection to the steering member to be connected through a link coupled to a rearward projection rigid with the tractor hitch.

Other features of this invention will become apparent from the preferred embodiments of the invention described below.

Figure 2:
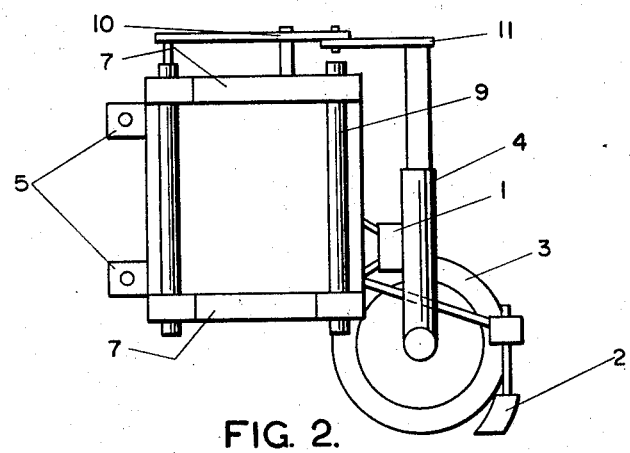
Figure 3:
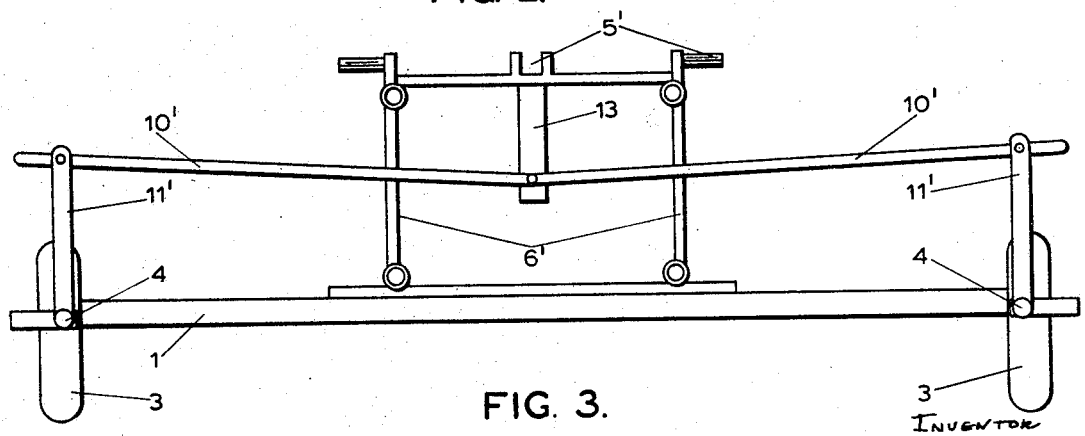
Figure 4:
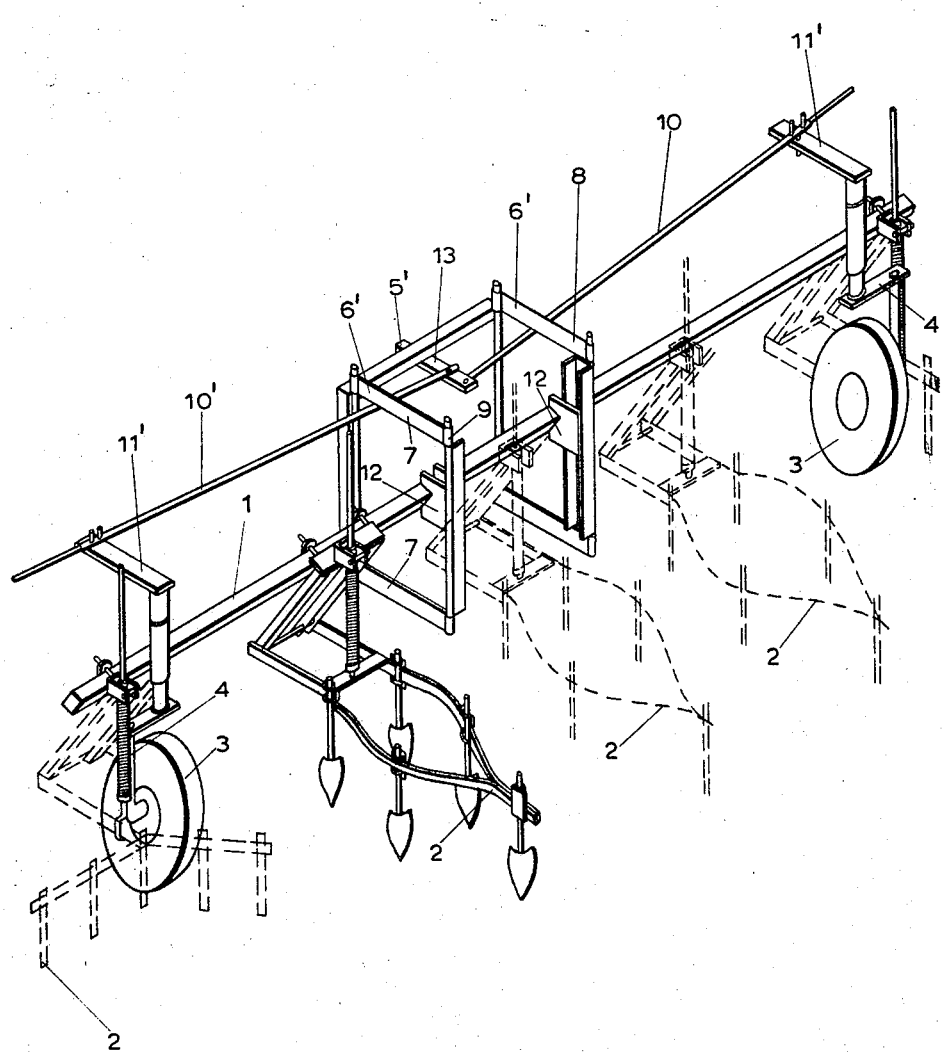

In the drawings accompanying this specification:

FIGS. 1 and 2 are diagrammatic views of an implement having a single land engaging wheel which is automatically steered, and FIGS. 3 and 4 are respectively a plan and perspective view of the invention applied to a cultivator assembly.

As shown in FIGS. 1 and 2 the implement structure provides rigid support beam or tool bar 1 for a pair of soil working implements 2 with a single landwheel 3 acting as the ground engaging steering member positioned between the implements 2 and mounted on a suitable kingpin assembly 4.

Between the implement structure and the tractor three-point hitch assembly 5 a coupling is inserted which comprises essentially a pair or parallel links 6 pivotally attached at one end to the hitch 5. The links 6 may each comprise a pair of arms 7 one above the other.

The other ends 8 of the links 6 are pivotally secured at 9 to the implement structure and are also connected therefore rigidly to each other. The kingpin assembly 4 is connected through a tie rod 10 and tie rod lever arm 11 to the rigid hitch assembly 5.

Any angular movement of the links 6 must cause movement of the kingpin assembly 4 relative to the hitch 5 and this will cause pivoting of the wheel 3 through the tie rod 10 and lever arm 11, and consequent steering of the implement behind the tractor to automatically follow movements of the tractor after a slight delay. The connection is made through tie rod 10 and tie rod lever steering arm 11.

This enables the implement to trail after the tractor in a properly steered manner and this is particularly advantageous during cultivation of crops in rows following contour lines in sloping lands. No additional operator other than the tractor driver is required so that cultivation may be effected at any time even at night. It will be appreicated that where the tractor varies only slightly and then corrects back to a straight path and is travelling fairly quickly, the deviation of the implement from the straight line can be very small.

This feature of automatic steerability of the implement is further effective in preventing meandering of the implement when the wheel encounters unevenness in the ground over which it travels since the steering will tend to hold the implement on its straight course.

One alternative arrangement which also allows for limited adjustability of the degree of steerage provided is set out in FIGS. 3 and 4.

In this embodiment a tool bar 1 is constructed for the interchangeable mounting of various agricultural implements 2 thereon. The tool bar 1 is supported at its ends or elsewhere on landwheels 3 through known forms of kingpin assemblies 4 each such assembly having a forwardly projecting tie rod lever arm secured thereto. The kingpin assemblies 4 will preferably be cranked as shown.

Symmetrically located along its length the tool bar 1 has a pair of rigid supporting brackets 12 mounted thereon. These brackets each carry a pair of parallel pivotally mounted links 6' projecting forwardly from the tool bar 1 and the pairs of links 6' are connected in a similar pivoted manner through rigid connecting members at their forward ends.

The rigid supporting members also form a usual three-point tractor hitch arrangement 5' and also rearwardly projecting rigid rearward projection 13. This projection 13 and the tie rod lever arms 11' referred to above are shorter than the two pairs of links 6' projecting forwardly from the tool bar 1.

Tie rods 10' connect the tie rod lever arms 11' to the projection 13 as shown and it will be noted that these tie rods 10' lie between the hitch arrangement 5' and the tool bar 1. Provision is also made for the attachment of the tie rods 10' at various positions along the length of the tie rod lever arms 11 so that the ratio of the length of the projection 13 to the lengths of the tie rods 10' can be adjusted.

In use the tool bar 1 can be used with different implements 2 as required and the arrangement of the hitch enables the landwheels 3 to follow the tractor track accurately without meandering. It will however be appreciated that the linkage which enables the implement to follow the tractor has a slightly delayed action and for this reason minor variations of tractor direction which are immediately corrected will not effect the movement of the implement trailing the tractor.

From the foregoing it will be understood also that the invention can be varied substantially in application from the particular forms described above.

Some examples of such variations are the use of two landwheels where one is steered as above described and the other is a castor arrangement. Further modifications include the use of pairs of links which are not parallel to each other and while divergent or convergent link assemblies are not generally desired, the action obtained from such an assembly may be advantageous under some circumstances. The fact that the links are not parallel will cause a lateral drag as well as a steered turn and this may be used to facilitate the breaking up of the soil in which the implements are working.

The examples described above also show that the tie rod and lever arm arrangement set out above referred to is not essential to the effective operation of this invention but it will be appreciated that such an arrangement does give the added advantage of variation of the degree of steerability.

Further steering members such as soil engaging blades running on or penetrating into the soil may be used either alone or in combination with landwheels to give the desired steering of the implement. Also landwheels may be provided to support the implement only and the steering be effected through the blades referred to. Such blades may also be used to effect depth control for the cultivation implement.

What I claim as new and desire to secure by Letters Patent is:

1. An agricultural implement support coupling comprising two pairs of links, each pair comprising upper and lower links, pivotal connections at one end of the links attaching the coupling to a rigid frame member providing a three-point tractor hitch, pivotal connections at the other end of the links connecting the links of each pair together and to an implement support, a rotatable ground engaging part of the implement support having a kingpin and lever arm connected thereto, means for steering said ground engaging part comprising a rearwardly projecting arm rigidly connected to said rigid frame member, and a link connecting the rear end of said projecting arm to said lever arm to cause pivoting of the ground engaging part on angular displacement of the links.

2. An implement coupling as claimed in claim 1 in which the ground engaging part of the implement is a landwheel mounted on the kingpin assembly.

3. An implement coupling as claimed in claim 1 in which a pair of wheel assemblies are provided as the ground engaging part, one on either side of the pairs of links.

4. An implement as claimed in claim 1 in which the connection of the pairs of links to each other and to the implement support is through the medium of a tool bar supporting the ground engaging parts of the implements.

References Cited

UNITED STATES PATENTS

| 1,856,997 | 5/1932 | Jacobs | 280—443 |
| 2,370,468 | 2/1945 | Hyland | 280—444 X |
| 2,772,617 | 12/1956 | Tangeman | 172—283 X |

OTHER REFERENCES

German printed application No. 1,166,541, published Mar. 26, 1964, Wagner and Reinhold.

LEO FRIAGLIA, *Primary Examiner.*

U.S. Cl. X.R.

172—282; 280—456, 411